US010529966B2

(12) United States Patent
Shoji et al.

(10) Patent No.: US 10,529,966 B2
(45) Date of Patent: Jan. 7, 2020

(54) BATTERY MODULE INCLUDING A SEPARATOR WITH A LID AND BATTERY PACK INCLUDING SAME

(71) Applicant: Yazaki Corporation, Tokyo (JP)

(72) Inventors: Takao Shoji, Shizuoka (JP); Shinichi Yanagihara, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 211 days.

(21) Appl. No.: 15/701,852

(22) Filed: Sep. 12, 2017

(65) Prior Publication Data

US 2018/0076429 A1    Mar. 15, 2018

(30) Foreign Application Priority Data

Sep. 13, 2016 (JP) ................. 2016-178659

(51) Int. Cl.
*H01M 2/14*    (2006.01)
*H01M 2/10*    (2006.01)
*H01M 10/48*   (2006.01)

(52) U.S. Cl.
CPC ....... *H01M 2/1077* (2013.01); *H01M 2/1083* (2013.01); *H01M 2/14* (2013.01); *H01M 10/482* (2013.01); *H01M 10/484* (2013.01); *H01M 2220/20* (2013.01)

(58) Field of Classification Search
CPC ............. H01M 2/1077; H01M 10/484; H01M 2/1083; H01M 10/482; H01M 2/14; H01M 2220/20
USPC ........................................................ 429/94
See application file for complete search history.

(56) References Cited

U.S. PATENT DOCUMENTS

2011/0236739 A1* 9/2011 Watanabe ........... H01M 2/1077
                                                          429/99
2013/0323552 A1   12/2013 Kurita

FOREIGN PATENT DOCUMENTS

| JP | 2011-222490 A | 11/2011 |
| JP | 2013-251125 A | 12/2013 |
| JP | 2014-212026 A | 11/2014 |
| JP | 2015-69729 A  | 4/2015  |
| JP | 2017-130338 A | 7/2017  |

OTHER PUBLICATIONS

Japanese Office Action for the related Japanese Patent Application No. 2016-178659 dated Oct. 23, 2018.

* cited by examiner

*Primary Examiner* — Gary D Harris
(74) *Attorney, Agent, or Firm* — Kenealy Vaidya LLP

(57) ABSTRACT

A battery module includes a plurality of battery cells each of which includes two electrodes and which are arranged such that two electrode groups formed of the electrodes arranged in a row are formed and are electrically connected in series or in parallel by physically and electrically connecting an electrical connection member to each of the two adjacent electrodes in the electrode group; a separator disposed at least between the adjacent battery cells to achieve insulation of the battery cells; and a restraint band holding a state in which the battery cell and the separator are alternately stacked. The separator includes a lid covering the electrical connection member connected to the electrode and the electrode as a connection target of the electrical connection member from a side opposite to the battery cell.

11 Claims, 16 Drawing Sheets

BATTERY MODULE INCLUDING A SEPARATOR WITH A LID AND BATTERY PACK INCLUDING SAME

CROSS-REFERENCE TO RELATED APPLICATION(S)

The present application claims priority to and incorporates by reference the entire contents of Japanese Patent Application No. 2016-178659 filed in Japan on Sep. 13, 2016.

BACKGROUND OF THE INVENTION

1. Field of the Invention

The present invention relates to a battery module and a battery pack.

2. Description of the Related Art

Conventionally, a battery module in which a large number of battery cells are arranged in series or in parallel has been mounted in electric vehicles and hybrid cars, from the viewpoint of output, cruising distance, and the like. In the battery module, the respective battery cells are arranged in series in a state where any one of electrode terminals of the respective battery cells are arranged in a row, and the other electrode terminals are also arranged in a row. Further, in this battery module, electrode terminals of adjacent battery cells are physically and electrically connected to each other by electrical connection members (bus bars or the like) for each electrode terminal group arranged in a row in the respective battery cells. The battery module is configured as a battery pack together with such a plurality of electrical connection members. A battery module and a battery pack of this type are disclosed in, for example, Japanese Patent Application Laid-open No. 2015-69729 to be described below.

Meanwhile, an insulating protection member, which covers an electrical connection member and separates the electrical connection member and an electrode terminal from other surrounding parts, is provided in the battery pack. The protection member is configured to achieve insulation and protection of the battery cell on the electrode terminal side. For example, the protection member is molded as a part different from a holding structural body (casing or the like) of each battery cell, and is attached to the holding structural body or the battery cell. Further, the protection member has a locking structure between the protection member and the holding structural body, and the locking structure enables the electrical connection member in the covered and hidden state to be locked to the holding structural body. In recent years, however, there is a demand for achievement of reduction in mounting space of the battery pack, reduction in vehicle weight, or the like by simplifying the configuration of the battery pack in the electric vehicles and the hybrid cars. There is room for improvement in the conventional battery module and battery pack in terms of simplification of configurations thereof.

SUMMARY OF THE INVENTION

Thus, an object of the present invention is to provide a battery module and a battery pack which have simple configurations and are capable of insulation and protection of a battery cell on an electrode side.

In order to achieve the above mentioned object, a battery module according to one aspect of the present invention includes a plurality of battery cells each of which includes two electrodes and which are arranged such that two electrode groups formed of the electrodes arranged in a row are formed and are electrically connected in series or in parallel by physically and electrically connecting an electrical connection member to each of the two adjacent electrodes in the electrode group; a separator that is disposed at least between the adjacent battery cells to achieve insulation of the battery cells; and a holding member that holds a state in which the battery cell and the separator are alternately stacked, wherein the separator includes a lid that covers the electrical connection member connected to the electrode and the electrode serving as a connection target of the electrical connection member from a side opposite to the battery cell.

According to another aspect of the present invention, in the battery module, it is desirable that the separator is linked to the lid by a linking portion having flexibility, and the lid is displaced between an open position before covering the electrical connection member connected to the electrode and a closed position of covering the electrical connection member connected to the electrode, using the flexibility of the linking portion.

According to still another aspect of the present invention, in the battery module, it is desirable that the separator includes a holding portion that holds the electrical connection member.

According to still another aspect of the present invention, in the battery module, it is desirable that the separator includes a guide wall of a battery state detector that guides components of a battery monitoring unit that is electrically connected to an arithmetic processing device of the battery monitoring unit, along a wiring path, detects state information of the battery cell, and sends the state information to the arithmetic processing device.

According to still another aspect of the present invention, in the battery module, it is desirable that the separator includes a holding structure of a battery state detector that holds components of a battery monitoring unit that is electrically connected to an arithmetic processing device of the battery monitoring unit, and detects state information of the battery cell and sends the state information to the arithmetic processing device.

In order to achieve the above mentioned object, a battery pack according to still another aspect of the present invention includes a plurality of battery cells each of which includes two electrodes and which are arranged such that two electrode groups formed of the electrodes arranged in a row are formed; an electrical connection member that causes the plurality of battery cells to be electrically connected in series or in parallel by being physically and electrically connected to each of the two adjacent electrodes in the electrode group; a separator that is disposed at least between the adjacent battery cells to achieve insulation of the battery cells; and a holding member that holds a state in which the battery cell and the separator are alternately stacked, wherein the separator includes a lid that covers the electrical connection member connected to the electrode from a side opposite to the battery cell.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
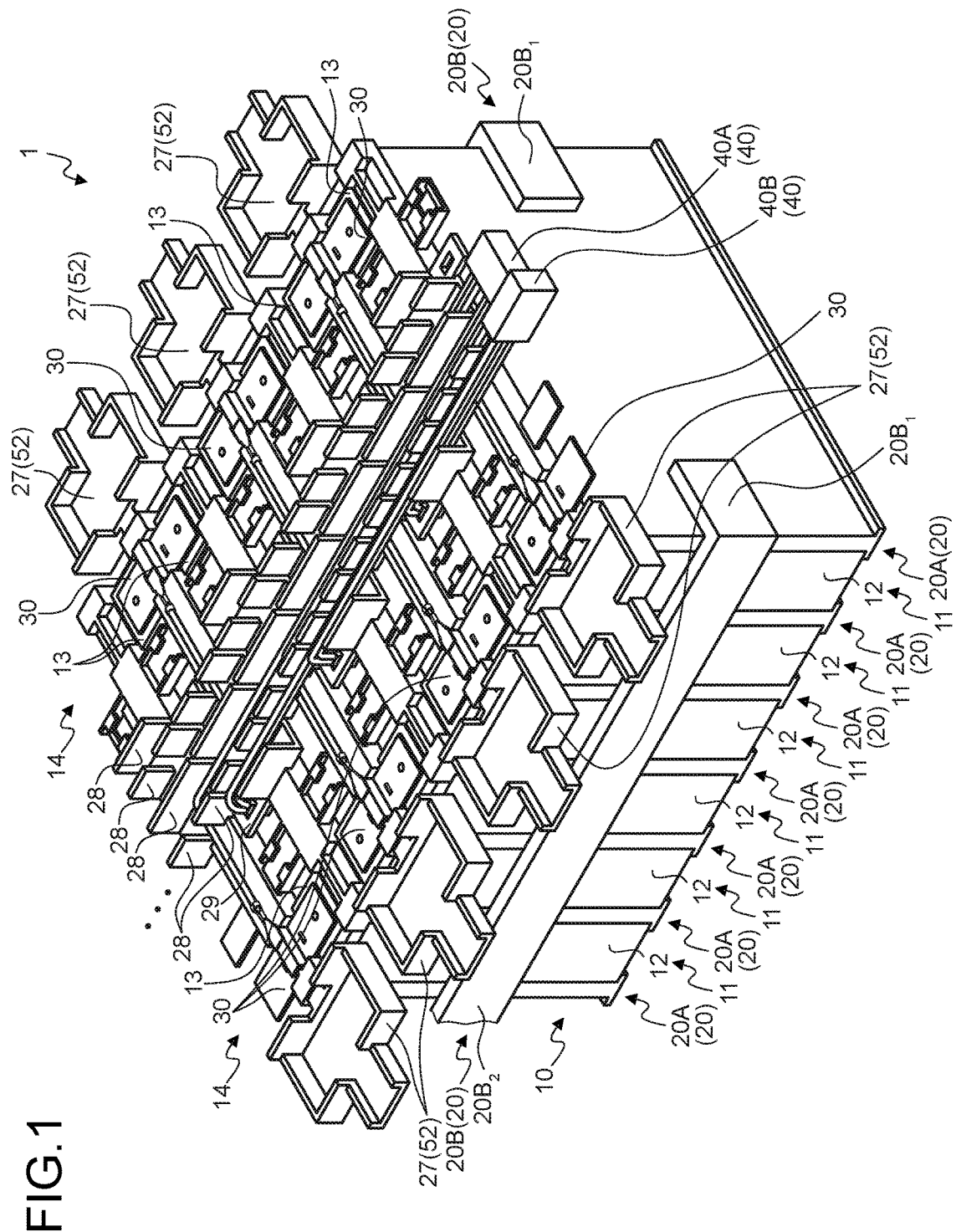
FIG. 1 is a perspective view illustrating a battery module and a battery pack according to an embodiment, and illustrates a state in which a lid is at an open position.

Hereinafter, embodiments of a battery module and a battery pack according to the present invention will be described in detail with reference to the drawings. Incidentally, the present invention is not limited by the embodiments.

Embodiment

One of the embodiments of the battery module and the battery pack according to the present invention will be described with reference to FIGS. 1 to 16.

Reference numeral 1 in FIGS. 1 to 4 represents the battery pack according to the present embodiment. Reference numeral 10 represents a battery module of the battery pack 1. Reference numeral 20 represents a holding structural body of each battery cell 11 in the battery module 10. Reference numeral 30 represents an electrical connection member to electrically connect the respective battery cells 11 to each other in an appropriate manner. Reference numeral 40 represents a battery state detector according to the present embodiment.

The battery pack 1 is mounted on a vehicle such as an electric vehicle or a hybrid car, and includes the battery module 10, the holding structural body 20, the electrical connection member 30, and the battery state detector 40. The battery module 10 is an aggregate of the plurality of battery cells 11. The holding structural body 20 is configured to collectively hold the plurality of battery cells 11 as the battery module 10. The electrical connection member 30 is configured to electrically connect the plurality of battery cells 11 in series or in parallel, and a plurality of the electrical connection members 30 are prepared. The battery state detector 40 is used at the time of detecting state information of the battery cell 11.

Figure 5:
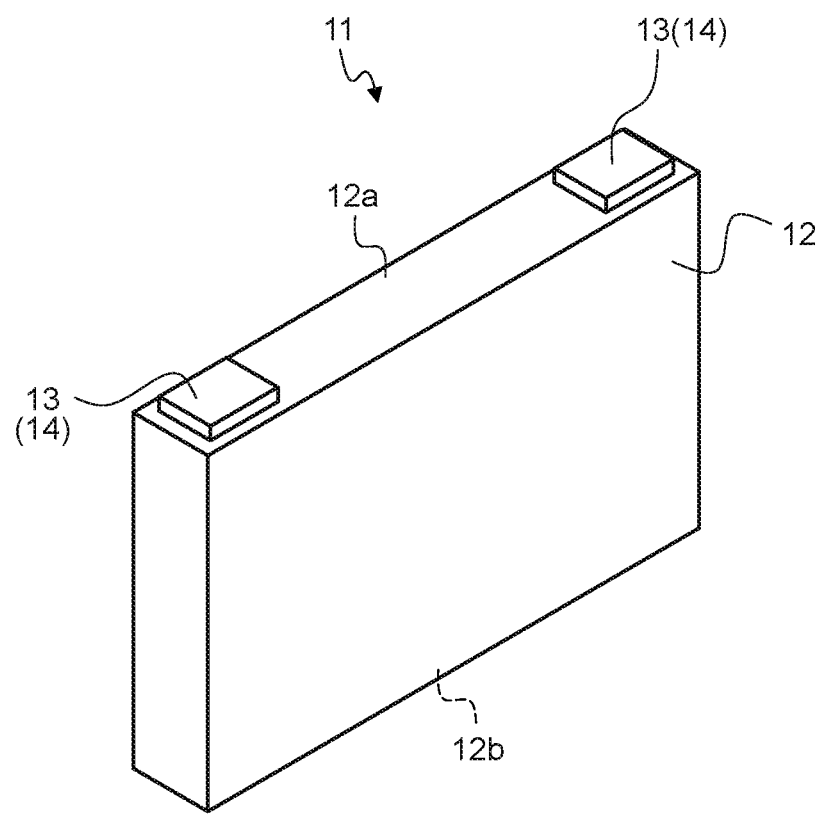
FIG. 5 is a perspective view illustrating a battery cell.

The battery cell 11 includes two electrodes 13 at one end of a cell body 12 (FIG. 5). For example, the cell body 12 is formed in a rectangular shape in the illustrated battery cell 11, and each of the electrodes 13 is provided on one outer wall surface (hereinafter, referred to as a "first outer wall surface") 12a of the cell body 12. In this illustrated example, the first outer wall surface 12a faces an upper side of the vehicle. In this battery cell 11, the electrodes 13 having a rectangular plate shape are provided at both ends of the first outer wall surface 12a in a longitudinal direction. One of the electrodes 13 is a positive electrode and the other thereof is a negative electrode.

Figure 6:
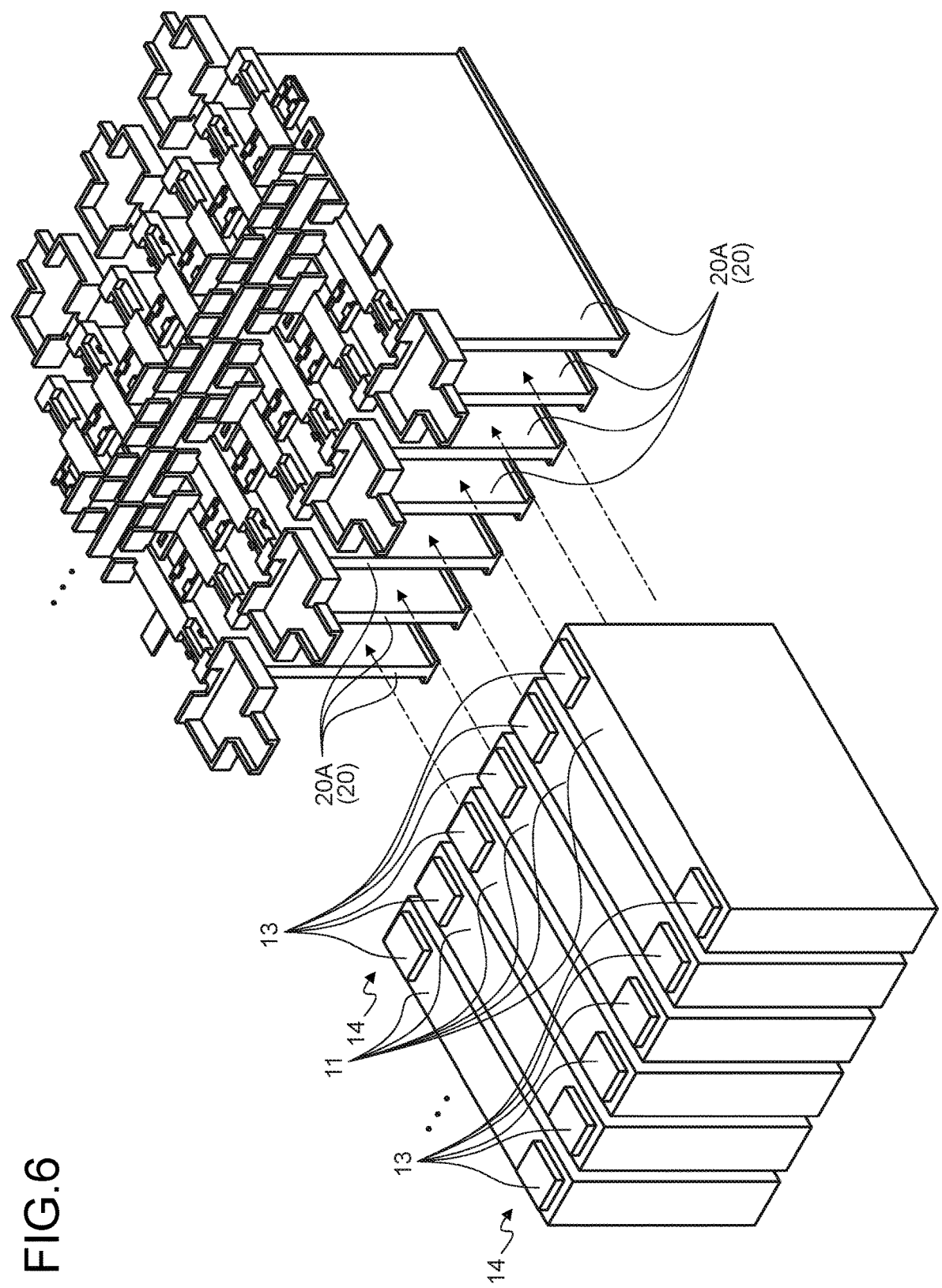
FIG. 6 is an exploded perspective view of the battery module.

In the battery module 10, the respective battery cells 11 are arranged in series in a state where any one of the electrodes 13 of the respective battery cells 11 are arranged in a row and the other electrodes 13 thereof are also arranged in a row. That is, the battery module 10 virtually forms a rectangular shape by arranging the plurality of battery cells 11, and two electrode groups 14 each of which is configured of the electrodes 13 arranged in a row are formed on one surface thereof (FIG. 6). There are two types of the battery module 10, one type is obtained by alternately disposing the positive electrode 13 and the negative electrode 13, and the other type is obtained by disposing the same electrode in the two electrode groups 14 arranged in a row. The electrodes 13 of the same polarity are aligned in each of the electrode groups 14 illustrated in this example. In this battery module 10, the number of arranged battery cells 11 may be any number. For example, the battery module 10 in each drawing is a part that is extracted from the plurality of arranged battery cells 11.

The rectangular shape of the battery module 10 (that is, the state as the aggregate of the battery cells 11) is maintained by the holding structural body 20. The holding structural body 20 includes a separator 20A, which is disposed at least between the adjacent battery cells 11 to achieve insulation between the battery cells 11, and a restraint band 20B as a holding member that holds the plurality of battery cells 11 collectively arranged via the separator 20A from the outside (FIGS. 1 to 4).

Figure 7:
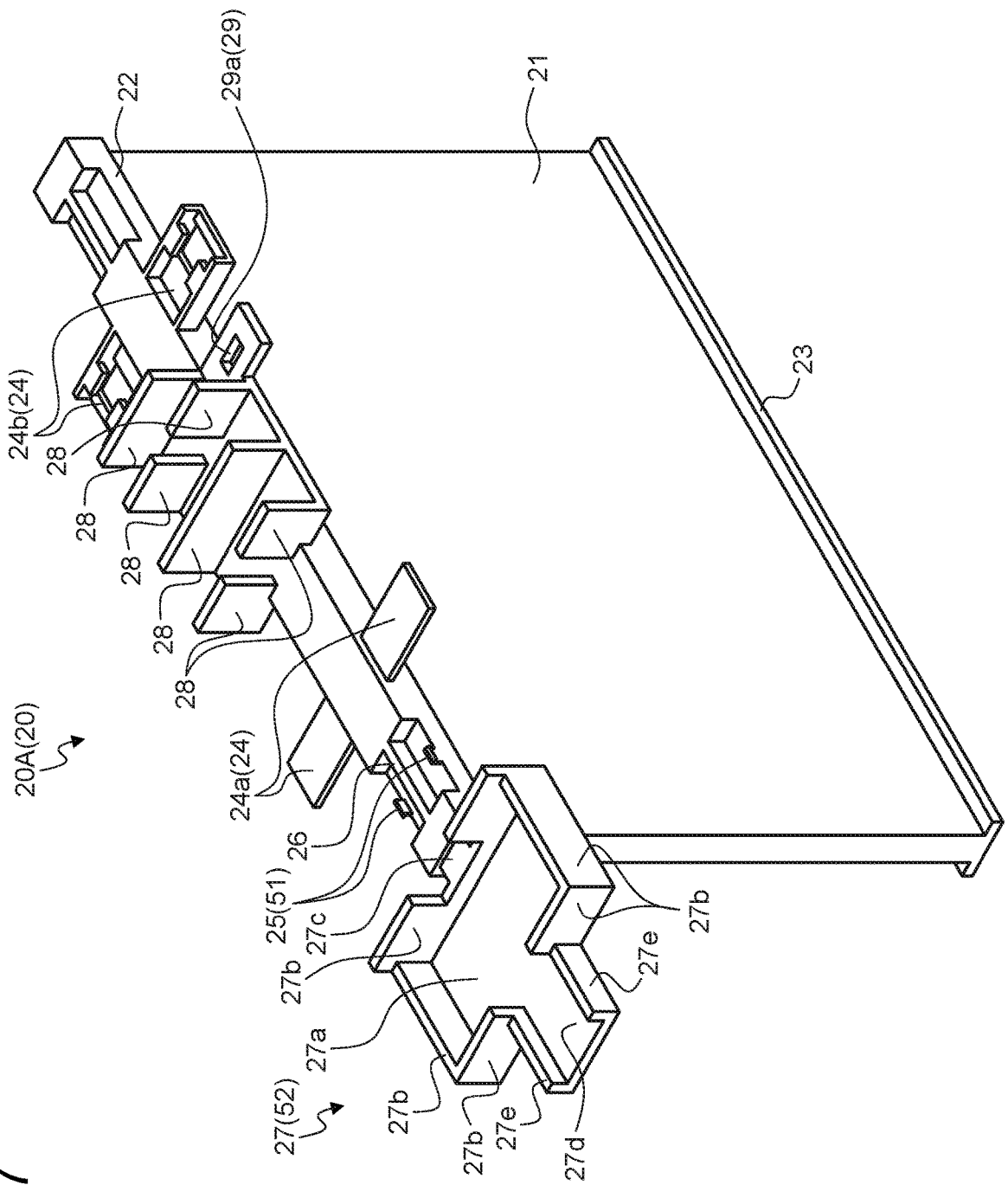
FIG. 7 is a perspective view illustrating a separator.

The separator 20A is formed using an insulating material such as synthetic resin. The separator 20A is interposed between the adjacent battery cells 11, thereby achieving insulation between the battery cells 11. Thus, the separator 20A illustrated in this example includes a main plate 21 having a rectangular plate shape that covers a main wall surface of the battery cell 11 (a wall surface having a main size such as wall surfaces opposing each other between the adjacent battery cells 11) (FIG. 7). Further, the separator 20A includes a first locking body 22 having a rectangular shape that has an orthogonal plane with respect to the main plate 21 and locks the first outer wall surface 12a of the cell body 12, and a second locking body 23 having a rectangular plate shape that has an orthogonal plane with respect to the main plate 21 and locks an outer wall surface (hereinafter, referred to as a "second outer wall surface") 12b (FIG. 5) on a side opposite to a side of the cell body 12 on which the electrode 13 is arranged (that is, a lower side of the vehicle) (FIG. 7).

The separator 20A is formed by integrally molding the main plate 21, the first locking body 22, and the second locking body 23. In this separator 20A, the first locking body 22 is disposed at an end portion on the upper side of the main plate 21 on the vehicle, and the second locking body 23 is disposed at an end portion on the lower side of the main plate 21 on the vehicle. Here, the first outer wall surface 12a of each of the two adjacent battery cells 11 is locked to the first locking body 22. In addition, the second outer wall surface 12b of each of two adjacent battery cells 11 is locked to the second locking body 23. Thus, the main plate 21, the first locking body 22, and the second locking body 23 are disposed so as to form an I-shaped cross section in the separator 20A.

The plurality of separators 20A are arranged along an arrangement direction of the respective battery cells 11 such that all of the battery cells 11 are sandwiched between the two separators 20A in the holding structural body 20 illustrated in this example.

In addition, the separators 20A are assembled to each other in advance to form a gap between the adjacent separators 20A in the holding structural body 20 illustrated in this example (FIG. 6). Then, the battery cell 11 is inserted while sliding into the gap. Therefore, the separator 20A is provided with a holding structure 24 that holds the separators 20A in the state of being assembled with each other (FIG. 7).

The holding structure 24 illustrated in this example includes a first fitting body 24a and a second fitting body 24b which are fitted to each other. The first fitting body 24a and the second fitting body 24b are provided on the first locking body 22. In the first locking body 22, the two first fitting bodies 24a are disposed on a side where a lid 27 to be described later is provided, and the two second fitting bodies 24b are disposed on the opposite side thereof. For example, each of the first fitting bodies 24a protrudes in directions opposite to each other along the arrangement direction of the separators 20A, and is formed in a piece shape. On the other hand, each of the second fitting bodies 24b protrudes in directions opposite to each other along the arrangement direction of the separators 20A, and has a space to which the first fitting body 24a of the adjacent separator 20A is fitted. The same type is used for all the separators 20A in the battery pack 1 illustrated in this example. The respective separators 20A can be assembled in advance by disposing the adjacently provided separators in directions opposite to each other and causing the first fitting body 24a of one separator and the second fitting body 24b of the other adjacent separator to each other.

The restraint band 20B is configured to hold the plurality of battery cells 11 and the plurality of separators 20A in the state of being alternately disposed and stacked in the arrangement direction of the respective battery cells 11. The restraint band 20B illustrated in this example is molded in a U-shape including two first locking portions $20B_1$, which respectively lock both ends (here, the respective planes of the main plates 21 of the two separators 20A at both ends) in the arrangement direction of the respective battery cells 11, and a second locking portion $20B_2$ which connects the two first locking portions $20B_1$ along the arrangement direction thereof and locks lateral sides of the plurality of battery cells 11 and the main plates 21 of the plurality of separators 20A (FIGS. 1 to 4). The two restraint bands 20B are provided so as to lock the respective lateral sides of each of the plurality of battery cells 11 and the plurality of separators 20A. The restraint band 20B is molded using an insulating material. For example, the restraint band 20B may be molded using a synthetic resin material or may be molded using an elastic material such as rubber. Incidentally, only one between the two first locking portions $20B_1$ is illustrated in the drawing.

Figure 8:
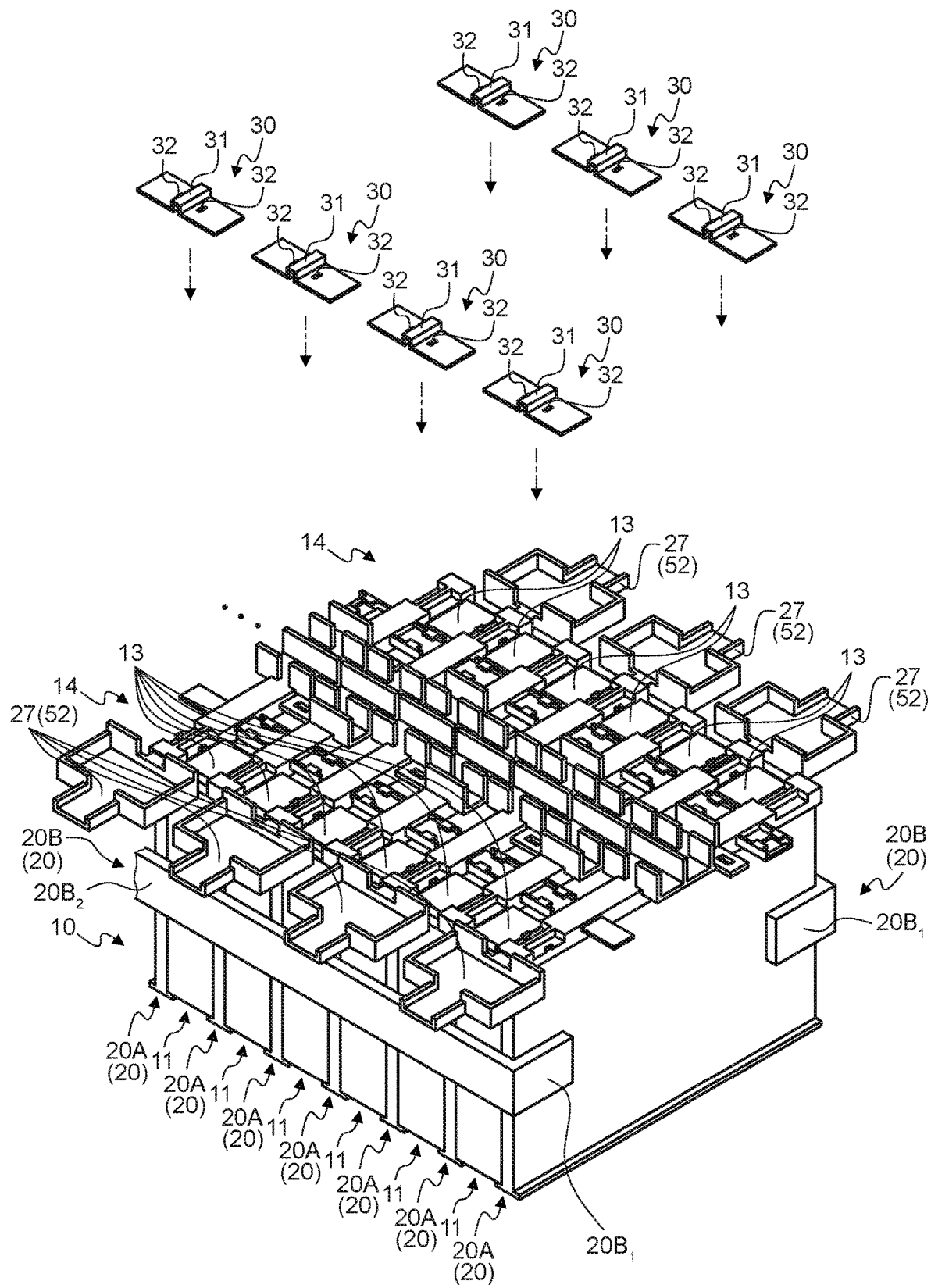
FIG. 8 is an exploded perspective view illustrating a state before assembling an electrical connection member.

FIG. 8 illustrates the battery module 10 in which the respective battery cells 11 are held by this holding structural body 20. The electrical connection member 30 is attached to the battery module 10 in this state. The electrical connection member 30 is formed using a conductive material such as metal and is physically and electrically connected to each of the two adjacent electrodes 13 in the electrode group 14, thereby causing the two electrodes 13 to be electrically connected to each other and causing the respective battery cells 11 to be electrically connected to each other in series or in parallel. The electrical connection member 30 illustrated in this example connects the electrodes 13 having the same polarity to each other. In addition, the electrical connection member 30 is sometimes connected to the total positive electrode or the total negative electrode of the battery module 10, and in this case, the electrical connection member 30 is physically and electrically connected to the electrode 13 as the total positive electrode or the electrode 13 as the total negative electrode. The plurality of electrical connection members 30 are arranged to have intervals from each other along the arrangement direction of the respective electrodes 13 in the electrode group 14. Incidentally, the battery cell 11 disposed at one end in the arrangement direction of the respective battery cells 11 has the electrode 13 serving as the total positive electrode, and the battery cell 11 disposed at the other end in the arrangement direction has the electrode 13 serving as the total negative electrode in the battery module 10.

Figure 9:
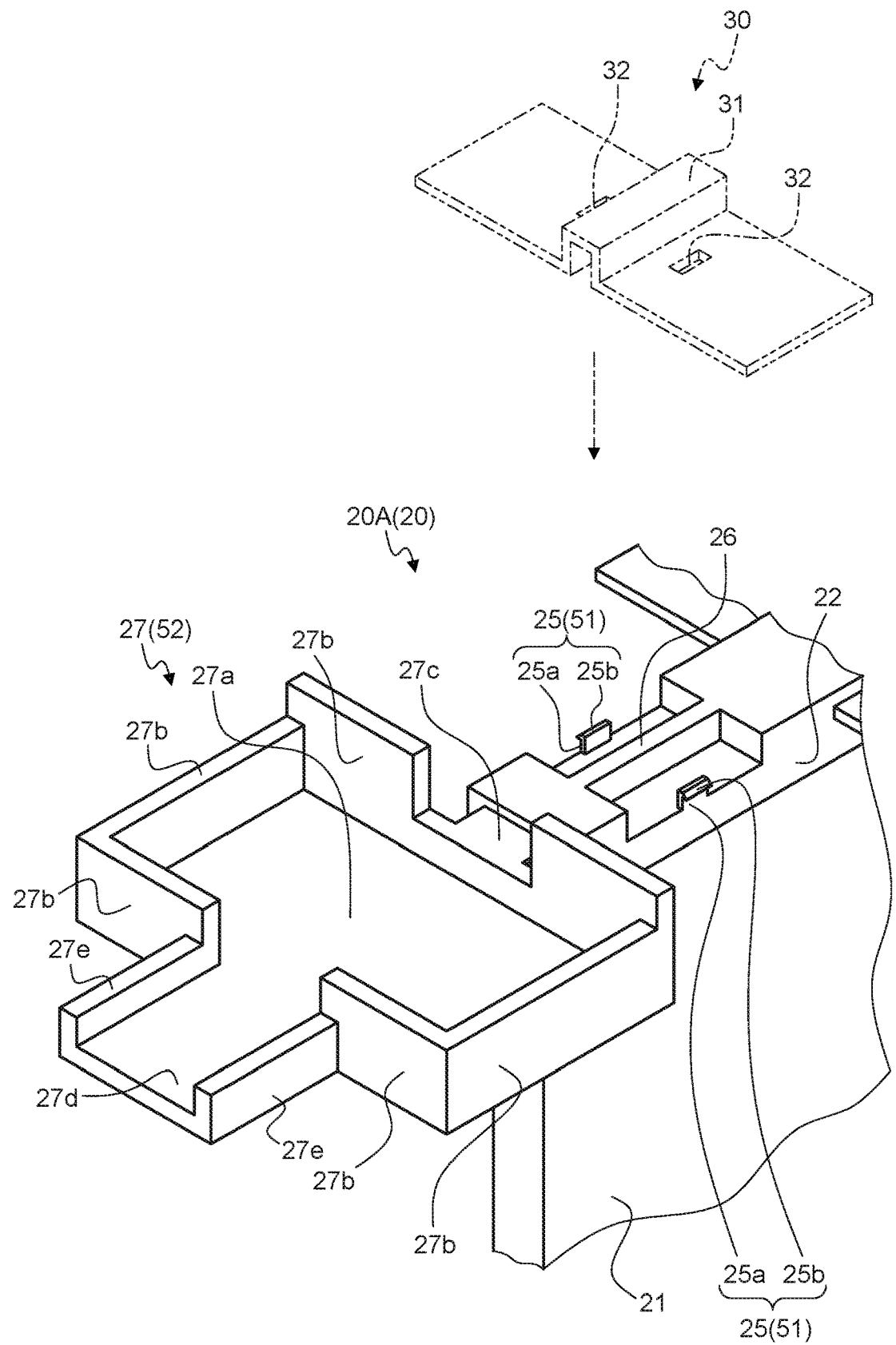
FIG. 9 is a perspective view obtained by enlarging a part of the separator.

A so-called bus bar molded in a rectangular plate shape is used as the electrical connection member 30 illustrated in this example. However, a central portion of the electrical connection member 30 illustrated in this example is formed to protrude by folding in order to realize a physical connection with a terminal 42 to be described later, and the terminal 42 is attached to such a protruding portion 31 (FIGS. 8 and 9). The electrical connection member 30 illustrated in this example has a cross-sectional shape such as a rectangular wave shape. The electrical connection member 30 is extended so as to be placed on each of the two adjacent electrodes 13 in the electrode group 14. That is, the electrical connection member 30 is disposed so as to straddle the separator 20A between the two battery cells 11 having the two electrodes 13. In addition, the same electrical connection member 30 illustrated in this example that can be connected to the two electrodes 13 is also used for the total positive electrode side and the total negative electrode side. Thus, the respective electrical connection members 30 on the total positive electrode side and the total negative electrode side are disposed on an outer side of the battery module 10 straddling the separators 20A at both ends, respectively, in the arrangement direction. Thus, the electrical connection member 30 is held by the separator 20A that the own electrical connection member straddles. A holding structure 51 to hold the electrical connection member 30 on the separator 20A is provided between the separator 20A and the electrical connection member 30 (FIGS. 7 and 9).

Figure 10:
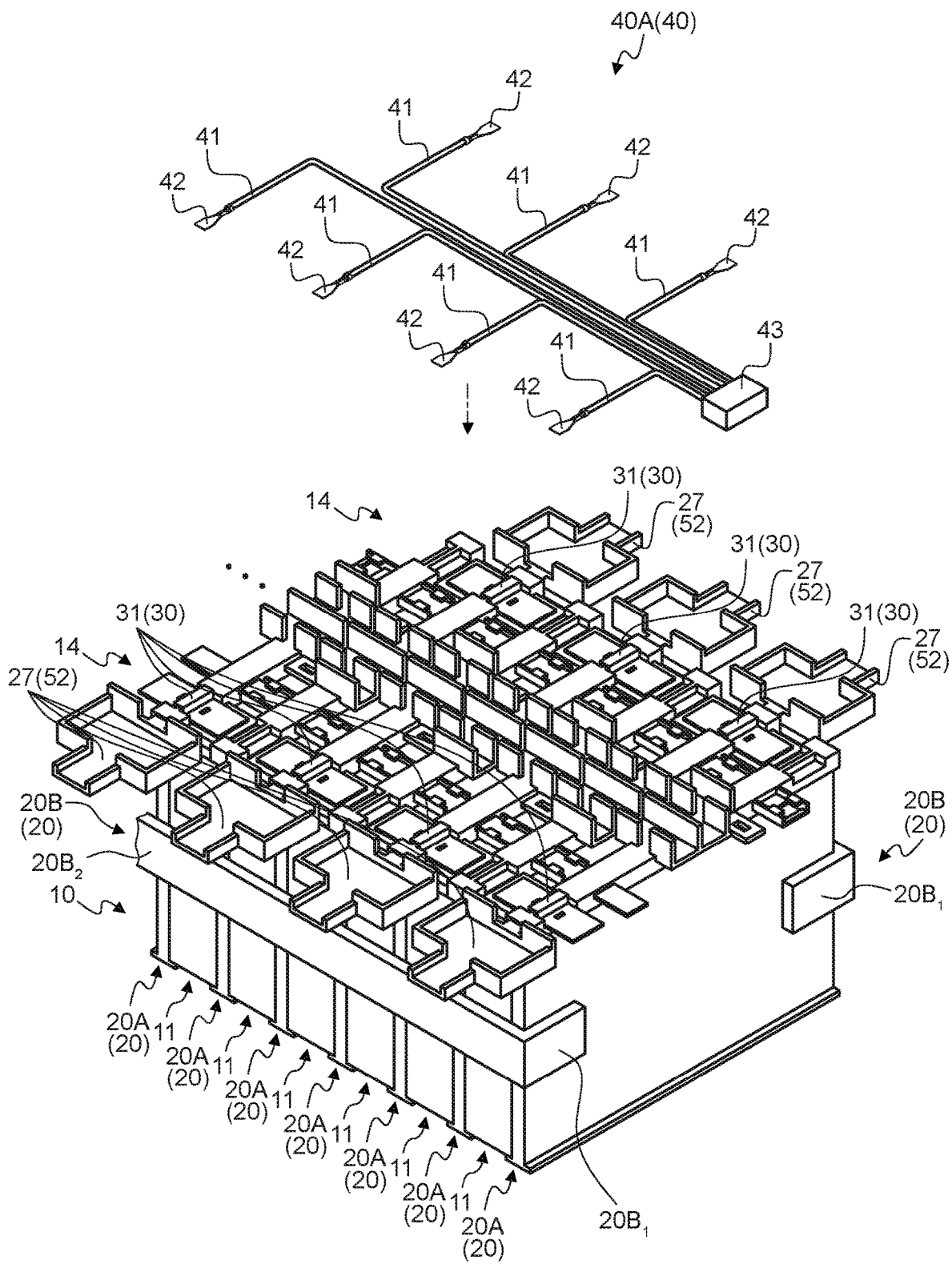
FIG. 10 is an exploded perspective view illustrating a state before assembling a voltage detector.

The holding structure 51 includes an engaging portion 25 (FIGS. 7 and 9) provided in the separator 20A and an engaged portion 32 (FIGS. 8 and 9) provided in the electrical connection member 30 and engaged with the engaging portion 25. In the holding structure 51, the engaging portion 25 and the engaged portion 32 are engaged with each other so that the electrical connection member 30 is held by the separator 20A. The engaging portion 25 forms a holding portion configured to hold the electrical connection member 30. On the other hand, the engaged portion 32 forms a held portion configured to be held by the engaging portion 25 of the separator 20A. Here, the electrical connection member 30 straddles the first locking body 22 of the separator 20A to be placed on the two adjacent electrodes 13, and surfaces of the electrodes 13 oppose each other at such a straddling portion. Therefore, the engaging portion 25 is provided on an opposing surface of the first locking body 22 that opposes the electrical connection member 30. Thus, this engaging portion 25 is provided at one point in the separator 20A. The engaging portion 25 has a flexible portion 25a having flexibility and protruding from the opposing surface of the first locking body 22 toward an opposing surface of the electrical connection member 30, and a claw portion 25b protruding from a free end (end portion on a protruding side) of the flexible portion 25a toward the arrangement direction of the respective battery cells 11 (FIG. 9). In this illustrated example, the two engaging portions 25 are disposed to have intervals from each other in the arrangement direction. The respective engaging portions 25 are disposed such that protruding directions of the respective claw portions 25b are set to be opposite to each other and the respective claw portions 25b do not oppose each other. The engaged portion 32 is formed as a through hole through which the engaging portion 25 is inserted from the claw portion 25b side when the electrical connection member 30 is placed on the two adjacent electrodes 13. Accordingly, the engaging portion 25 disposes the claw portion 25b so as to be caught by the surface of the electrical connection member 30 when being taken out from the engaged portion 32 (FIG. 10). The engaged portion 32 is provided for each of the engaging portions 25.

As illustrated above, the central portion of the electrical connection member 30 illustrated in this example is formed to protrude by folding in order to realize the physical connection with the terminal 42 to be described later. Thus, a rectangular space is formed at an inner side of the protruding portion 31 in the central portion of the electrical connection member 30 along with the folding. In the first locking body 22 illustrated in this example, a rectangular protruding portion 26 to be inserted into the space portion is provided (FIGS. 7 and 9).

The electrical connection member 30 is physically connected to each of the two adjacent electrodes 13 in the state of being held by the separator 20A through the holding structure 51. In this illustrated example, the electrode 13 and the electrical connection member 30 are connected by welding (for example, laser welding).

This battery module 10 is provided with an insulating protection structure 52 which covers the electrical connection member 30 connected to the electrode 13 from an outer side and isolates the electrical connection member 30 and the electrode 13 serving as a connection target of the electrical connection member 30 from other surrounding parts and the like (FIGS. 1 to 4, 7, 9 and 10). The insulating protection structure 52 is provided on each of the separators 20A. The separator 20A has the lid 27 that covers the electrical connection member 30 connected to the electrode 13 together with the electrode 13 as the connection target of the electrical connection member 30 from a side opposite to the battery cell 11 (FIGS. 7, 9 and 10).

The lid 27 covers the electrical connection member 30 straddling the first locking body 22 of the own separator 20A and is provided on a side where the engaging portion 25 of the corresponding first locking body 22 is disposed. The lid 27 has a main wall 27a and a side wall 27b (FIGS. 7 and 9), and these main wall 27a and side wall 27b cover the electrical connection member 30 and the electrode 13. The main wall 27a is formed so as to be capable of covering the electrical connection member 30 and the two electrodes 13 connected to the electrical connection member 30 from the side opposite to the battery cell 11. The example main wall 27a is formed as a rectangular flat plate and has a larger plane than the rectangular flat surface of the electrical connection member 30. The side wall 27b is erected from a predetermined position on the peripheral edge of the main wall 27a. The lid 27 accommodates the electrical connection member 30 connected to the electrode 13 in the internal space formed by the main wall 27a and the side wall 27b. Therefore, the lid 27 can isolate the electrical connection member 30 connected to the electrode 13 and the electrode 13 as the connection target of the electrical connection member 30 so as not to be in contact with the other surrounding parts and the like.

Figure 2:
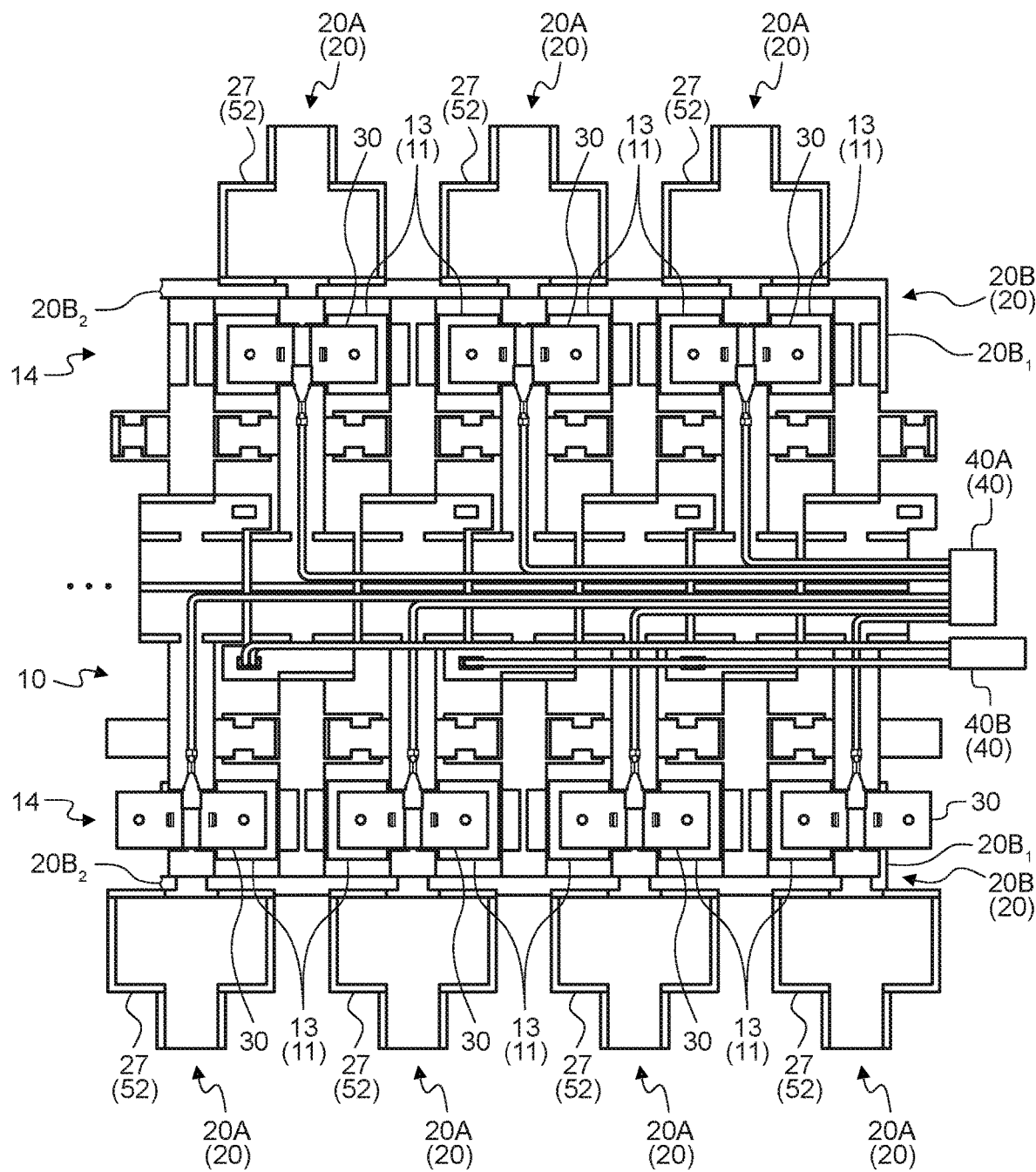
FIG. 2 is a top view illustrating the battery module and the battery pack according to the embodiment, and illustrates a state in which the lid is at the open position.

In the separator 20A, the lid 27 is retracted to a position that does not interfere with a work process relating to the electrical connection member 30 until covering the electrical connection member 30 connected to the electrode 13 (FIGS. 1 and 2). The working process relating to the electrical connection member 30 includes at least a process of placing the electrical connection member 30 on the battery module 10, a process of physically connecting the electrical connection member 30 to the electrode 13, and a process of physically connecting the terminal 42 to the electrical connection member 30 to be described later. Hereinafter, a retract position of the lid 27 with respect to the first locking body 22 is referred to as an "open position". On the contrary, a position of the lid 27 in the state of covering the electrical connection member 30 connected to the electrode 13 is referred to as a "closed position". In the insulating protection structure 52 illustrated in this example, a linking portion 27c, which links the lid 27 to the first locking body 22 is provided such that the lid 27 can be displaced between the open position and the closed position (FIGS. 3, 7 and 9), and the linking portion 27c thereof is made flexible. Accordingly, it is possible to displace the lid 27 between the open position (FIGS. 1 and 2) before covering the electrical connection member 30 connected to the electrode 13 and the closed position (FIGS. 3 and 4) of covering the electrical connection member 30 connected to the electrode 13 using the flexibility of the linking portion 27c. Incidentally, it is desirable to provide a holding mechanism such as a lock mechanism, which holds the lid 27 at the closed position, in the separator 20A although not illustrated.

Further, the lid 27 has a convex wall 27d protruding from the main wall 27a on the same plane (FIGS. 7, 9, and 10). The convex wall 27d protrudes from a center of an end portion of the main wall 27a and is formed such that the terminal 42 to be described later can be covered from the side opposite to the battery cell 11 when the lid 27 is at the closed position. In addition, the lid 27 has a side wall 27e erected from a predetermined position on a peripheral edge of the convex wall 27d (FIGS. 7, 9, and 10). The side wall 27e is disposed at two places so as to cover the terminals 42 in the arrangement direction of the respective battery cells 11. Accordingly, the lid 27 can also isolate the conductive terminal 42 so as not to be in contact with the other surrounding parts and the like.

Incidentally, the battery pack 1 illustrated in this example is provided with the battery state detector 40 as a component of a battery monitoring unit. The battery monitoring unit monitors a state (voltage, temperature, or the like) of the battery cell 11, and includes an arithmetic processing device E (FIG. 4) in addition to the battery state detector 40. The battery state detector 40 detects the state information of the battery cell 11 and sends an electric signal relating to the state information to the arithmetic processing device E. The arithmetic processing device E grasps the state of the battery cell 11 based on the input electric signal relating to the state information.

Figure 3:
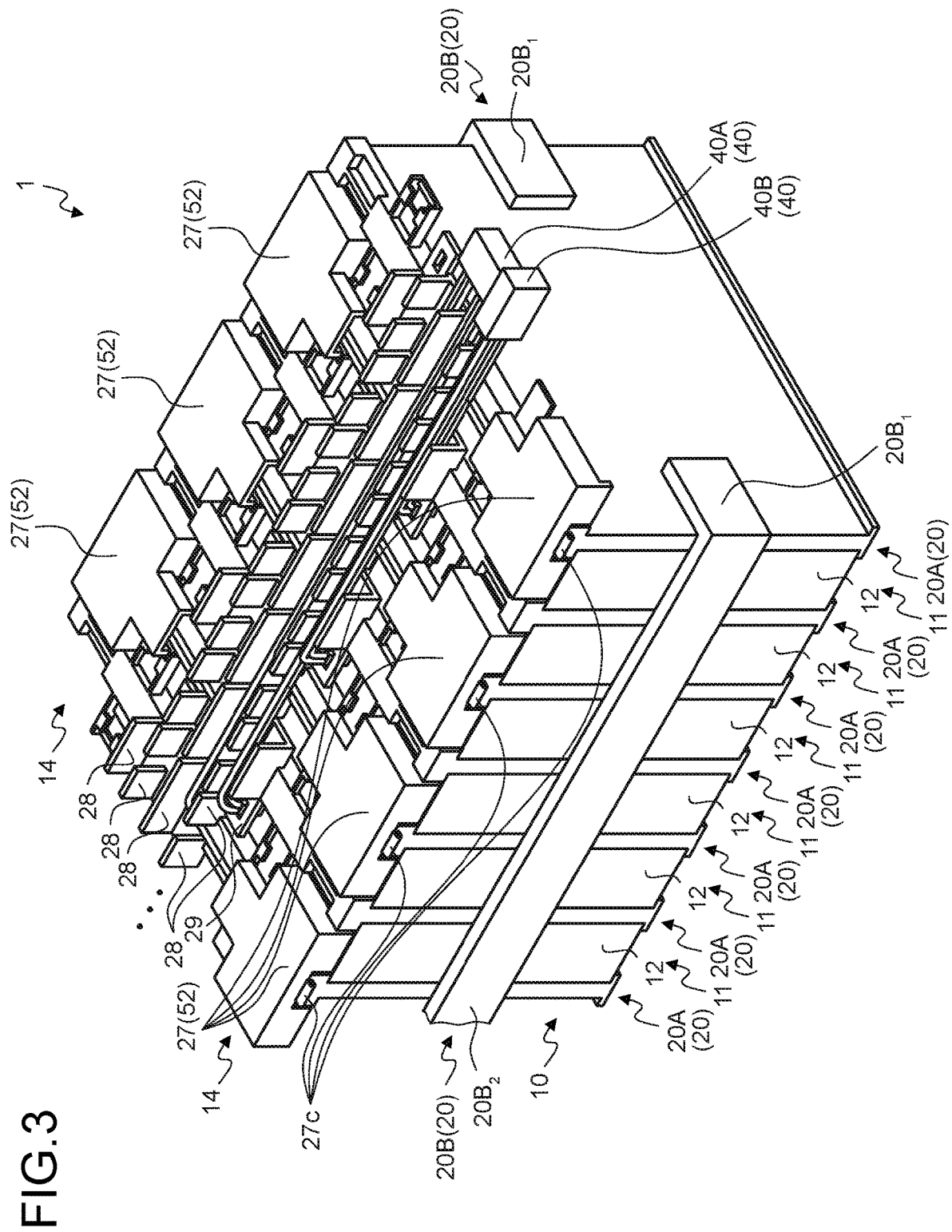
FIG. 3 is a perspective view illustrating the battery module and the battery pack according to the embodiment, and illustrates a state in which the lid is at a closed position.
Figure 4:
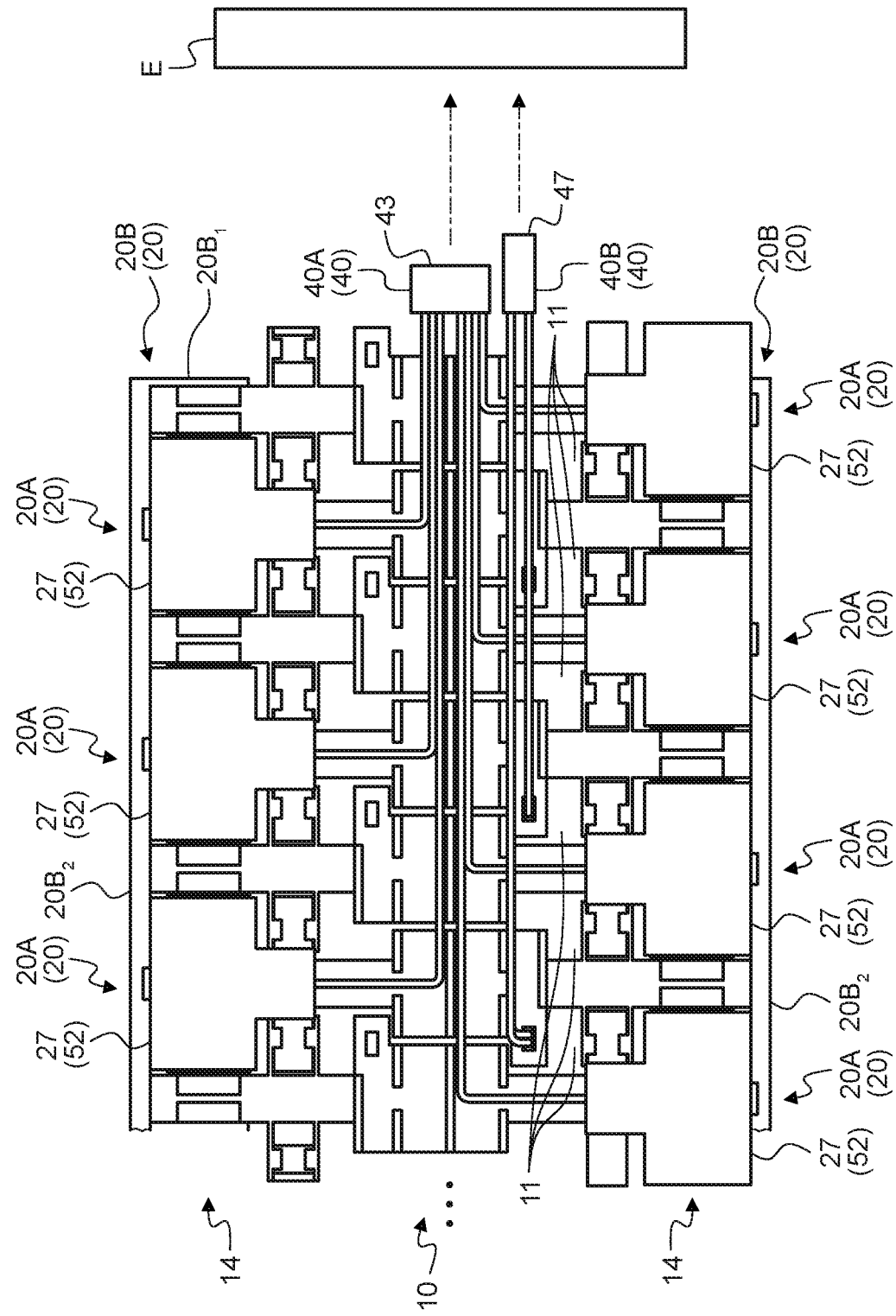
FIG. 4 is a top view illustrating the battery module and the battery pack according to the embodiment, and illustrates a state in which the lid is at the closed position.

The battery state detector 40 is arranged in the battery module 10 toward the battery cell 11 as a detection target in order to detect the state information of the battery cell 11. Thus, each of the separators 20A has a guide wall 28 to guide the battery state detector 40 along a wiring path in this illustrated example (FIGS. 1, 3 and 7). One or a plurality of the guide walls 28 may be provided so as to guide the entire battery state detector 40, or one or a plurality of the guide walls 28 may be provided so as to partially guide the battery state detector 40. In addition, each of the separators 20A has a holding structure 29 to hold the arranged battery state detector 40 (FIGS. 1, 3, and 7). One or a plurality of the holding structures 29 may be provided so as to entirely hold the battery state detector 40, or one or a plurality of the holding structures 29 may be provided so as to partially hold the battery state detector 40.

Specifically, a voltage detector 40A that detects the voltage of the battery cell 11 and a temperature detector 40B that detects the temperature of the battery cell 11 are provided as the battery state detector 40 in this illustrated example (FIGS. 1 to 4).

First, the voltage detector 40A will be described. Since the electrical connection member 30 connects the two electrodes 13 having the same polarity in the battery pack 1 illustrated in this example, the three electrical connection members 30 are physically and electrically connected in the adjacent battery cells 11. Thus, the voltage of each of the battery cells 11 can be grasped by detecting a potential on a positive electrode side and a potential on a negative electrode side among the three electrical connection members 30. Thus, an electric wire 41 (FIG. 10) is provided for each of the electrical connection members 30, and one end of each of the electric wires 41 is electrically connected to each of the electrical connection members 30 serving as a connection target in the voltage detector 40A illustrated in this example.

The voltage detector 40A illustrated in this example includes the plurality of electric wires 41, the terminals 42 each of which is physically and electrically connected to one end of each of the electric wires 41, and a connector 43 to which the other ends of the respective electric wires 41 are physically and electrically connected (FIG. 10). Each of the electric wires 41 extends along the arrangement direction of the respective battery cells 11 between the two electrode groups 14 and is folded toward the electrical connection member 30 as the connection target. The respective electric wires 41 are guided by the plurality of guide walls 28 provided in the respective separators 20A along the wiring route thereof. The terminal 42 is physically and electrically connected to one end of the electric wire 41 by, for example, crimping (caulking or the like), and is physically and electrically connected to the protruding portion 31 of the electrical connection member 30 by welding (laser welding or the like). The connector 43 electrically connects each of the plurality of electric wires 41 to the arithmetic processing device E, and is fitted to a connector (not illustrated) on the arithmetic processing device E side.

In the voltage detector 40A, it is possible to detect the potential on the positive electrode side and the potential on the negative electrode side among the three electrical connection members 30 relating to two adjacent battery cells 11 as the state information, and to send the electric signal relating to the state information from the connector 43 to the arithmetic processing device E. The arithmetic processing device E can grasp the voltage of the two adjacent battery cells 11 by obtaining a potential difference between the positive electrode side and the negative electrode side based on the electric signal relating to the state information.

Figure 11:
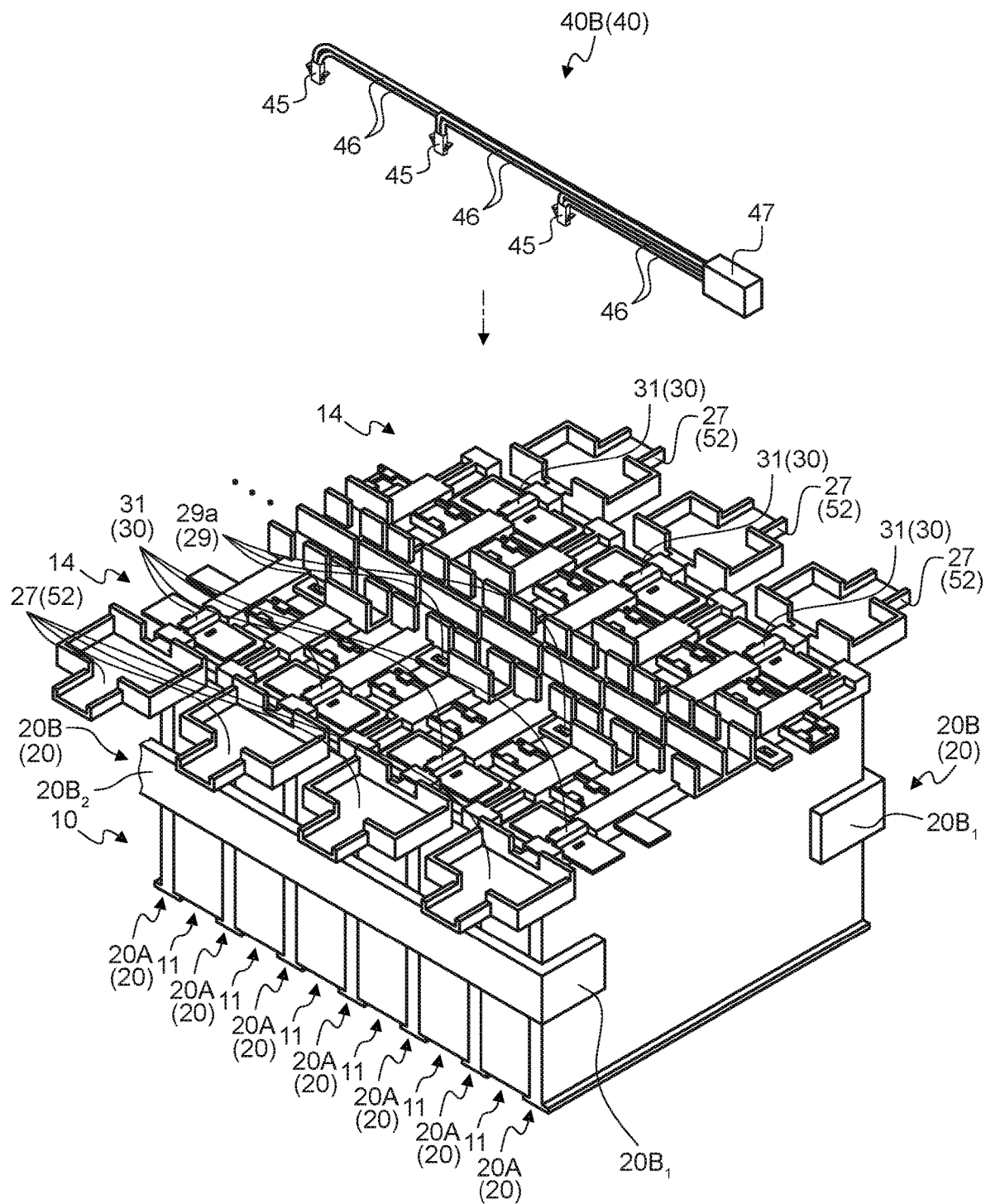
FIG. 11 is an exploded perspective view illustrating a state before assembling a temperature detector.

Next, the temperature detector 40B will be described. The temperature detector 40B may detect the temperature of all the battery cells 11 or may detect the temperature of a predetermined one among the battery cells 11. In this illustrated example, the temperature of every other one of the battery cells 11 is detected. The temperature detector 40B includes a temperature sensor 45 that detects the temperature of the battery cell 11, an electric wire 46 led out from the temperature sensor 45, and a connector 47 to which the electric wire 46 is physically and electrically connected (FIG. 11). The temperature sensor 45 is provided for each of the battery cells 11 as a detection target. A through hole 29a to which the temperature sensor 45 is inserted to be fitted or locked thereto is provided as a holding structure 29 in each of the separators 20A (FIGS. 7 and 11). The temperature sensor 45 is held by the separator 20A through the through hole 29a. The electric wire 46 of each of the temperature sensors 45 is extended between the two electrode groups 14 along the arrangement direction of the respective battery cells 11. The respective electric wires 46 are guided by the plurality of guide walls 28 provided on the respective separators 20A along the wiring route thereof. The connector 47 electrically connects each of the plurality of electric wires 46 to the arithmetic processing device E, and is fitted to a connector (not illustrated) on the arithmetic processing device E side.

The temperature detector 40B can detect temperature information of the battery cell 11, which is the detection target, as the state information, and send the electrical signal relating to the state information from the connector 47 to the arithmetic processing device E. The arithmetic processing device E can grasp the temperature of the battery cell 11 based on the electric signal relating to the state information.

As described above, the battery module 10 according to the present embodiment employs a mode in which the plurality of battery cells 11 and the plurality of separators 20A are alternately stacked and such a stacked state is held by the restraint band 20B, and has a simple configuration in which it is unnecessary to house these parts in, for example, a casing. In addition, the battery cells 11 at both ends in the arrangement direction are also sandwiched by the separators 20A in the battery module 10 illustrated in this example. Thus, the battery module 10 and the battery pack 1 according to the present embodiment can achieve electrical insulation and protection of the cell body 12 of the battery cell 11 with the simple configuration. Further, since the battery module 10 and the battery pack 1 are configured such that the lid 27 is provided on the separator 20A and the electrical connection member 30 and the electrode 13 as the connection target of the electrical connection member 30 are covered by the lid 27, it is possible to achieve the electrical insulation and protection of the battery cell 11 on the side of the electrode 13 while having the simple structure. In addition, since the lid 27 is formed so as to cover the terminal 42 of the voltage detector 40A by the convex wall 27d and the side wall 27e, it is possible to isolate the portion of the terminal 42 that protrudes from the electrical connection member 30 and an exposed core wire of the electric wire 41 connected to the terminal 42 from the other surrounding parts and the like. Thus, the battery module 10 and the battery pack 1 can enhance the performance of electrical insulation and protection of the battery cell 11 on the electrode 13 side while having the simple configurations. In this manner, the battery module 10 and the battery pack 1 according to the present embodiment can perform the electrical insulation and protection of conductive parts such as the battery cell 11 and the electrical connection member 30 while having the simple configurations.

Figure 12:
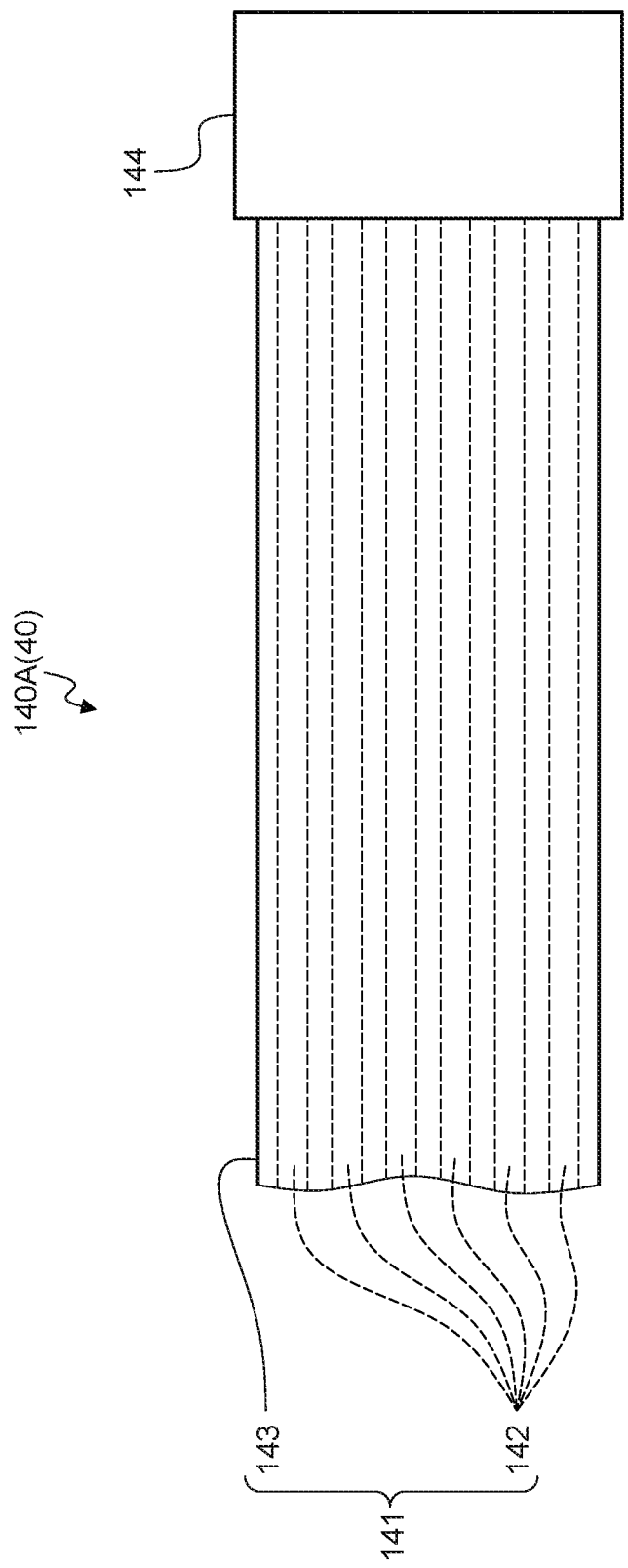
FIG. 12 is a top view illustrating a voltage detector according to a modification.
Figure 13:
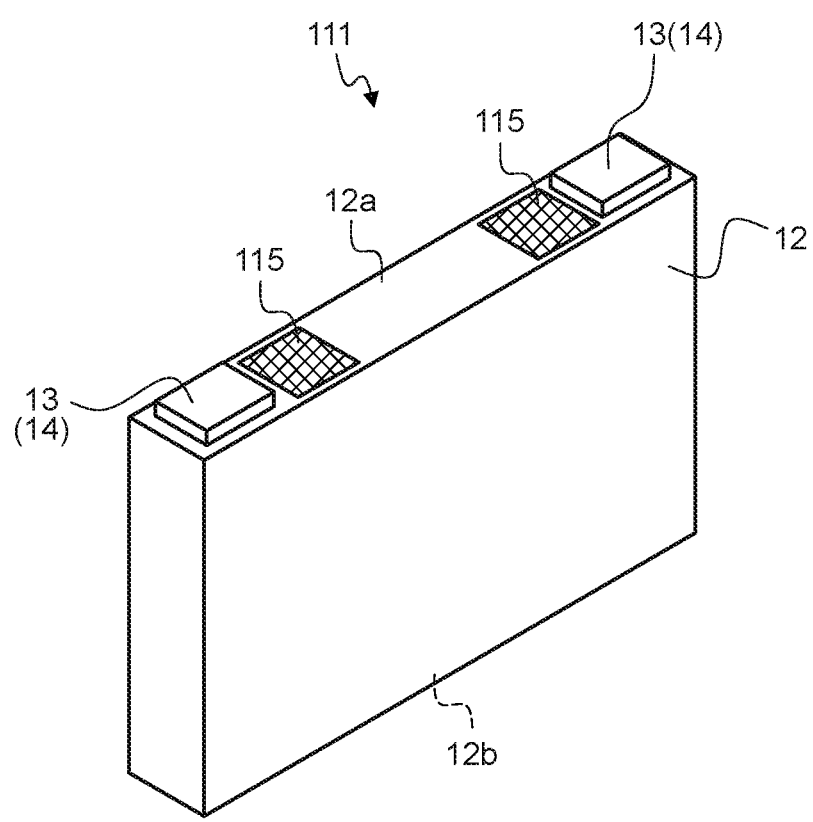
FIG. 13 is a perspective view illustrating a battery cell according to the modification.

Incidentally, the voltage detector 40A may be replaced with a voltage detector 140A to be described later in the battery module 10 and the battery pack 1 (FIG. 12). In this case, the battery cell 11 illustrated above is replaced with a battery cell 111 to be described later (FIG. 13).

The battery cell 111 illustrated in this example corresponds to one in which an equipotential portion 115 is provided for each of the electrodes 13 in the battery cell 11 illustrated above. The equipotential portion 115 is a portion having the same potential as the electrode 13 of the battery cell 111 and is provided for each of the electrodes 13. That is, each of the equipotential portions 115 is provided such that one side thereof has the same potential as the positive electrode 13 and the other side thereof has the same potential as the negative electrode 13. The same potential referred to herein includes not only the same value as the potential of the electrode 13 but also a value deviated from the potential of the electrode 13 within a range in which an actual voltage value of the battery cell 111 can be detected. Each of the equipotential portions 115 is provided on the first outer wall surface 12a of the cell body 12 on which the electrode 13 is disposed. For example, the equipotential portion 115 may be one in which a conductive portion having the same potential as the electrode 13 is exposed to the outside on the first outer wall surface 12a of the cell body 12, or one in which the conductive portion having the same potential as the electrode 13 is attached to the first outer wall surface 12a of the cell body 12. In addition, the electrode 13 may be provided to entirely or partially extend along the first outer wall surface 12a, and such an extending portion may be used as the equipotential portion 115 in the battery cell 111. In the equipotential portion 115 of this illustrated example, the conductive portion having the same potential as the electrode 13 is exposed at the first outer wall surface 12a of the cell body 12. Thus, the equipotential portion 115 is indicated by cross hatching in FIG. 13 for the sake of convenience.

The voltage detector 140A is disposed for each of the electrode groups 14. The voltage detector 140A includes a flexible conductive member 141 having flexibility. The flexible conductive member 141 is electrically connected to the equipotential portion 115 of each of the electrodes 13 in the electrode group 14 serving as a disposition target. The flexible conductive member 141 includes a conductive portion 142, which has flexibility, for each of the equipotential portions 115 and an insulating portion 143 having flexibility (FIG. 12).

The conductive portion 142 is electrically connected to each of the arithmetic processing device E and the equipotential portion 115 serving as a connection target. The insulating portion 143 electrically insulates the plurality of conductive portions 142 from each other. The flexible conductive member 141 is formed by integrating the plurality of conductive portions 142 and the insulating portion 143, and is assembled to the battery module 10 in the state of being extended in the arrangement direction of the respective battery cells 111. When electric signals of the two conductive portions 142 relating to the common battery cell 111 are input from both of the flexible conductive members 141, the arithmetic processing device E obtains a potential difference based on the respective electric signals and calculates a voltage of this battery cell 111.

Figure 14:
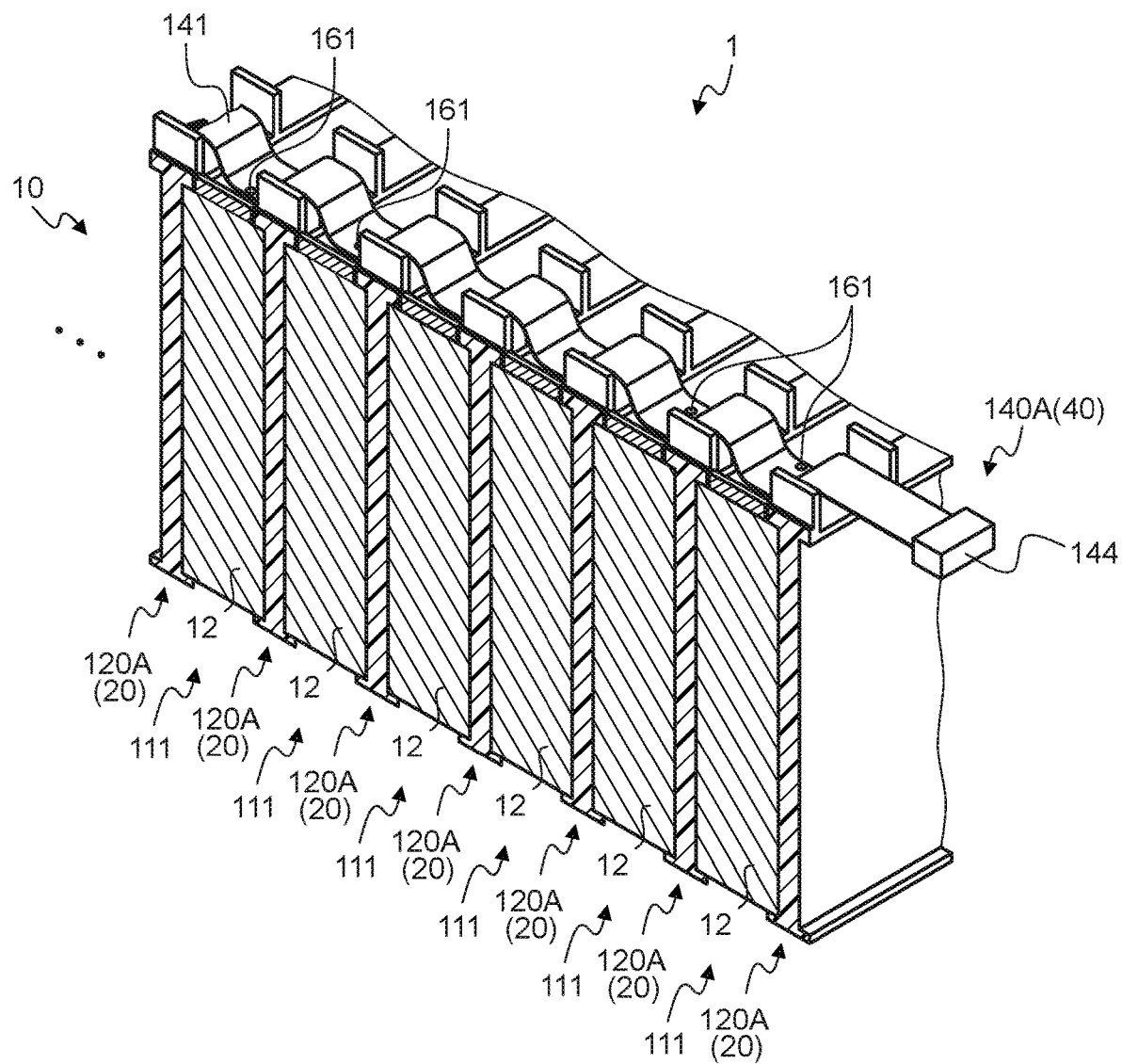
FIG. 14 is a perspective view partially illustrating an assembled state of the voltage detector according to the modification.
Figure 15:
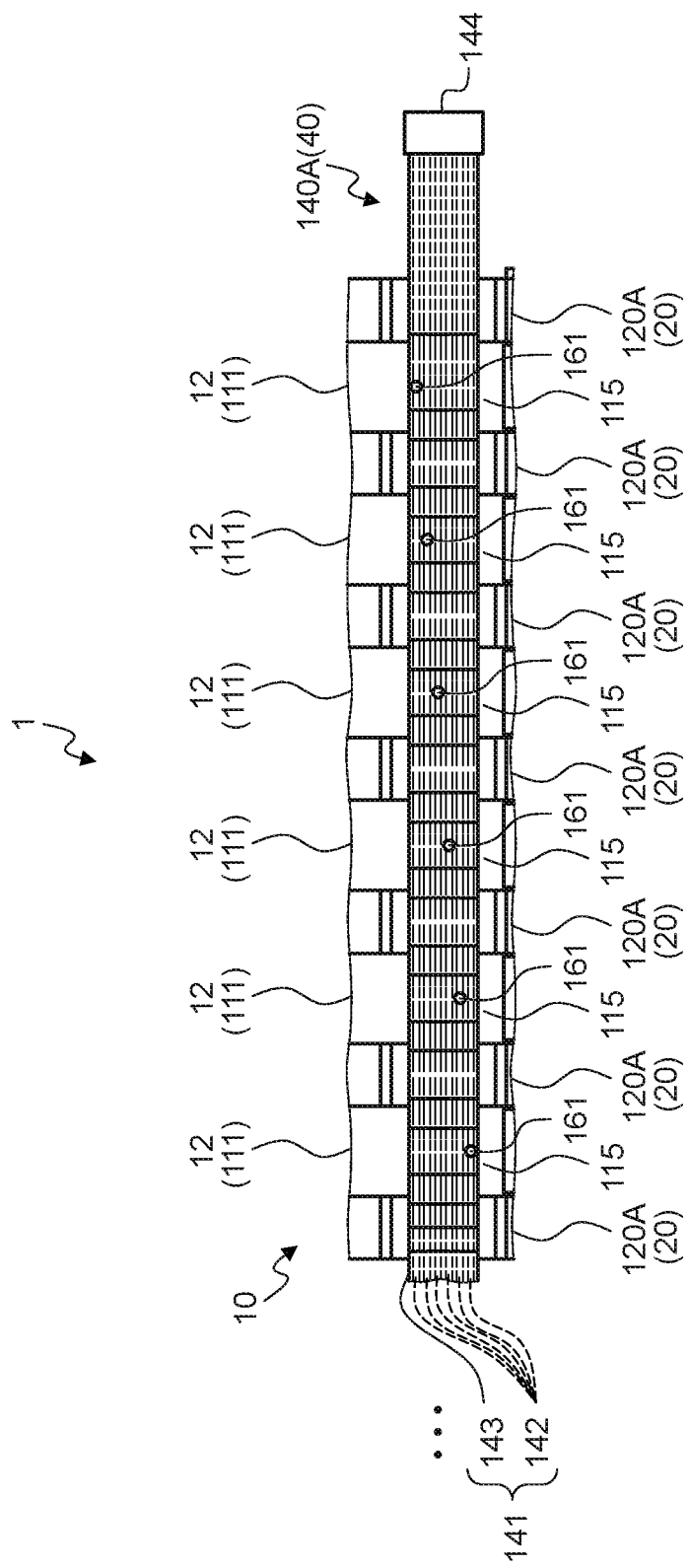
FIG. 15 is a top view partially illustrating the assembled state of the voltage detector according to the modification.

The voltage detector 140A includes a connector 144 to be assembled to the flexible conductive member 141 (FIG. 12). In this illustrated example, the connector 144 is provided for each of the flexible conductive members 141. The connector 144 electrically connects each of the plurality of conductive portions 142 in the flexible conductive member 141 to the arithmetic processing device E, and is fitted to a connector (not illustrated) on the arithmetic processing device E side. On the other hand, a connection portion 161, which physically and electrically connects the conductive portion 142 and the equipotential portion 115 to each other, is provided between the conductive portion 142 and the equipotential portion 115 serving connection targets to each other (FIGS. 14 and 15).

Hereinafter, a specific example of the flexible conductive member 141 will be described.

The flexible conductive member 141 according to the present embodiment is configured as a flexible flat conductive member formed to be flat. For example, it is possible to use a flat cable (so-called FC), a flexible flat cable (so-called FFC), a printed circuit body such as a flexible printed circuit board (so-called FPC) and a membrane wiring board, or the like as the flexible conductive member 141. In this specific example, the flexible flat cable is taken as an example of the flexible conductive member 141.

The flexible conductive member 141 in this illustrated example includes the plurality of conductive portions 142 which extend along the arrangement direction of the respective battery cells 111 and are arranged to have intervals from each other along the first outer wall surfaces 12a of the respective cell bodies 12. The conductive portion 142 illustrated in this example is a conductor that is molded in a foil shape using a conductive material such as a metal (for example, copper), and has flexibility to a degree that can be processed to be folded. The insulating portion 143 covers the plurality of conductive portions 142 with such arrangement so as to enclose the conductive portions 142, and is formed using a material such as synthetic resin having an electrical insulation property and flexibility. The insulating portion 143 illustrated in this example is formed such that an external shape thereof is similar to a flat plate.

The flexible conductive member 141 illustrated in this example is provided with the plurality of connection portions 161 for each of the conductive portions 142. In this illustrated example, the conductive portion 142 and the equipotential portion 115 are connected by welding (for example, laser welding). Accordingly, the connection portion 161 is provided as a fusion coupling portion that is formed along with welding between the conductive portion 142 and the equipotential portion 115. Incidentally, the conductive portion 142 and the equipotential portion 115 may be directly connected to each other using another connection form such as soldering, and further, may be indirectly connected to each other with a conductive connection member interposed therebetween.

In addition, the flexible conductive member 141 in this illustrated example is assembled to the battery module 10 in the state of being deflected between the connection portions 161 which are adjacently provided. Such deflection is configured to absorb a tolerance variation in a mutual positional relationship between the adjacent battery cells 111 (deviation of the interval in the arrangement direction of the respective battery cells 111, positional deviation of the first outer wall surfaces 12a of the respective cell bodies 12, or the like) when the flexible conductive member 141 is assembled to the battery module 10, and is configured to absorb expansion and contraction of the cell body 12 at the time of charge and discharge after being assembled to the battery module 10. Thus, a magnitude of this deflection is determined in consideration of the tolerance variation and the expansion and contraction of the cell body 12. Accordingly, the battery module 10 and the battery pack 1 illustrated in this example can improve workability of assembling the flexible conductive member 141 to the battery module 10, and further, reduce a load on the flexible conductive member 141 after the assembling. Therefore, the battery module 10 and the battery pack 1 can improve the durability of the flexible conductive member 141, and further, it is possible to hold an electrical connection state between the conductive portion 142 and the equipotential portion 115 since a load on the connection portion 161 is also reduced and it is possible to maintain connection strength of the connection portion 161.

Figure 16:
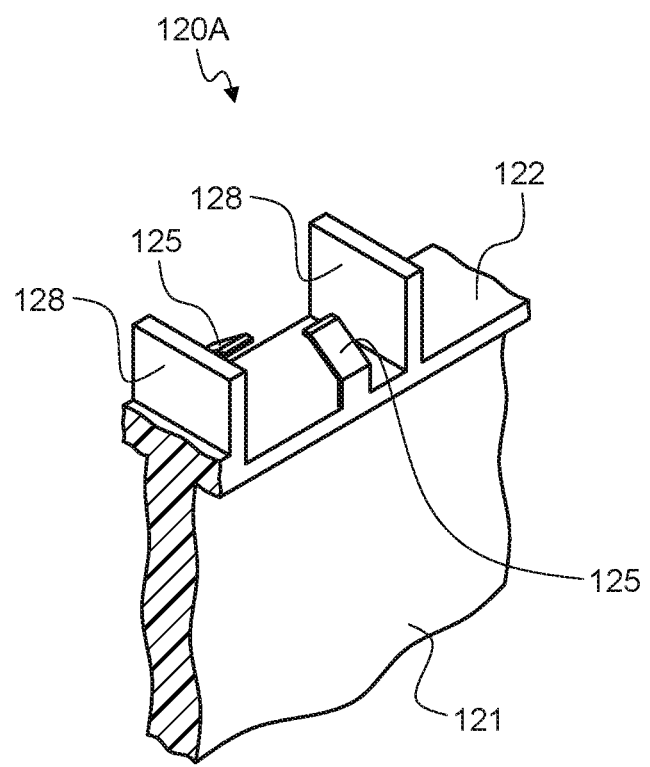
FIG. 16 is a perspective view obtained by enlarging a part of a separator according to the modification.

In order to dispose the above-described voltage detector 140A, the separator 20A illustrated above is replaced with a separator 120A to be described later in the battery module 10 and the battery pack 1 illustrated in this example (FIG. 16).

The separator 120A includes a main plate 121 and a first locking body 122, similar to the main plate 21 and the first locking body 22 of the separator 20A, and the lid 27 (not illustrated), which covers the electrical connection member 30 attached separately from the voltage detector 140A and the electrode 13 serving as a connection target of the electrical connection member 30, and the like, thereby corresponding to one obtained by changing the following points in the separator 20A.

The separator 120A is provided with a locking portion 125 configured to maintain deflection of the flexible conductive member 141 assembled to the battery module 10 (FIG. 16). The flexible conductive member 141 is locked to the locking portion 125 in the state of being deflected between the adjacently provided connection portions 161. For example, the flexible conductive member 141 straddles the first locking body 122 of the separator 120A between the adjacently provided connection portions 161, and a curved surface of a deflected portion opposes a surface of the first locking body 122 at such a straddling portion. Thus, the locking portion 125 is provided on an opposing surface of the first locking body 122 that opposes the flexible conductive member 141. The locking portion 125 protrudes from the opposing surface of the first locking body 122 toward the curved surface of the deflected portion of the flexible conductive member 141. Accordingly, the locking portion 125 can maintain the deflection of the flexible conductive member 141 assembled to the battery module 10. In addition, the locking portion 125 is formed so as to have flexibility and elasticity such that input from the deflected portion of the flexible conductive member 141 is absorbed. Therefore, the battery module 10 and the battery pack 1 according to the present embodiment can improve the durability of the flexible conductive member 141 and the locking portion 125 since the input of an excessive load between the flexible conductive member 141 and the locking portion 125 is reduced when the expansion and contraction of the cell body 12 or the like occurs.

For example, the locking portion 125 illustrated in this example is a plate-shaped member that is folded in an L-shape, and the two locking portions 125 are provided for one deflected portion of the flexible conductive member 141. In addition, the two flexible conductive members 141 straddle different places, respectively, in the first locking body 122 illustrated in this example. Thus, such a combination of the two locking portions 125 is provided for each of the flexible conductive member 141.

Further, the first locking body 122 of the separator 120A is provided with two wall portions 128 such that the combination of the two locking portions 125 is interposed therebetween (FIG. 16). The respective wall portions 128 are provided such that the deflected portion of the flexible conductive member 141, which straddles the two locking portions 125, is interposed therebetween and are disposed to have intervals from each other in a width direction of the flexible conductive member 141 (a direction along an arrangement direction of the respective conductive portions 142). In addition, each of the wall portions 128 is disposed at an interval wider than a width of the flexible conductive member 141 and at an interval that prevents the deflected portion from leaving a locking position set by the two locking portions 125.

The battery module 10 and the battery pack 1 configured in this manner can send the electric signal, required at the time of detecting the voltage of the battery cell 111, from the battery cell 111 to the arithmetic processing device E without using other parts (for example, the electrical connection member 30 and the like). That is, the battery module 10 and the battery pack 1 can obtain the electric signal required for detection of the voltage of the battery cell 111 with the simple configurations.

For example, it is necessary to physically and electrically connect the electrical connection member 30 and the terminal 42 in a direct manner after assembling the electrical connection member 30 and the voltage detector 40A to the battery module 10 in the case of obtaining the electric signal of the battery cell 111 via the electrical connection member 30 as described above, and thus, there is a risk that the number of steps of the assembling work increases. Further, it is necessary to integrate the electrical connection member 30 and the voltage detector 40A and assemble this integrated body to the battery module 10, for example, in order to suppress such deterioration of the assembling workability. However, there is a possibility that a size of such an integrated body increases, and there is a risk of causing an increase in size of the battery pack 1. In addition, there is a possibility that a holding structure for the battery module 10 is additionally is required in this integrated body, and there is a risk of causing the size increase and an increase in cost accompanying such a requirement. On the other hand, the battery module 10 and the battery pack 1 illustrated in this example have the simple configurations capable of obtaining the electric signal required for detection of the voltage of the battery cell 111 without using the other parts such as the electrical connection member 30, and thus, are superior in assembling workability and can suppress the increase in cost. In addition, it is possible to suppress the increase of the size in the battery pack 1. Accordingly, the battery module 10 and the battery pack 1 can achieve the electrical insulation and protection of the conductive parts such as the battery cell 111 and the electrical connection member 30 while achieving further simplification of the configurations.

A battery module and a battery pack according to the present embodiment employ a mode in which a plurality of battery cells and a plurality of separators are alternately stacked and such a stacked state is held by a holding member, and have simple configurations in which it is unnecessary to house these parts in a casing, for example.

Further, the battery module and the battery pack are configured such that a lid is provided for the separator and the lid covers an electrical connection member and an electrode serving as a connection target of the electrical connection member. Therefore, the battery module and the battery pack can achieve electrical insulation and protection of the battery cell on the electrode side while having the simple configurations.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A battery module comprising:
   a plurality of battery cells each of which includes two electrodes and which are arranged such that two electrode groups formed of the electrodes arranged in a row are formed and are electrically connected in series or in parallel by physically and electrically connecting an electrical connection member to each of the two adjacent electrodes in the electrode group;
   a separator that is disposed at least between the adjacent battery cells to achieve insulation of the battery cells; and
   a holding member that holds a state in which the battery cell and the separator are alternately stacked, wherein
   the separator includes a lid that covers the electrical connection member connected to the electrode and the electrode serving as a connection target of the electrical connection member from a side opposite to the battery cell,
   the separator includes a holding portion that is separate from the lid,
   the holding portion connects the electrical connection member to the separator, and
   the electrical connection member extends away from the holding portion and toward the electrodes.

2. The battery module according to claim 1, wherein
   the separator is linked to the lid by a linking portion having flexibility, and
   the lid is displaced between an open position before covering the electrical connection member connected to the electrode and a closed position of covering the electrical connection member connected to the electrode, using the flexibility of the linking portion.

3. The battery module according to claim 1, wherein
   the separator includes a guide wall of a battery state detector that guides components of a battery monitoring unit that is electrically connected to an arithmetic processing device of the battery monitoring unit, along a wiring path, detects state information of the battery cell, and sends the state information to the arithmetic processing device.

4. The battery module according to claim 2, wherein
   the separator includes a guide wall of a battery state detector that guides components of a battery monitoring unit that is electrically connected to an arithmetic processing device of the battery monitoring unit, along a wiring path, detects state information of the battery cell, and sends the state information to the arithmetic processing device.

5. The battery module according to claim 1, wherein
   the separator includes a holding structure of a battery state detector that holds components of a battery monitoring unit that is electrically connected to an arithmetic processing device of the battery monitoring unit, and detects state information of the battery cell and sends the state information to the arithmetic processing device.

6. The battery module according to claim 2, wherein
   the separator includes a holding structure of a battery state detector that holds components of a battery monitoring unit that is electrically connected to an arithmetic processing device of the battery monitoring unit, and detects state information of the battery cell and sends the state information to the arithmetic processing device.

7. The battery module according to claim 3, wherein the separator includes a holding structure of a battery state detector that holds components of a battery monitoring unit that is electrically connected to an arithmetic processing device of the battery monitoring unit, and detects state information of the battery cell and sends the state information to the arithmetic processing device.

8. A battery pack comprising:
   a plurality of battery cells each of which includes two electrodes and which are arranged such that two electrode groups formed of the electrodes arranged in a row are formed;
   an electrical connection member that causes the plurality of battery cells to be electrically connected in series or in parallel by being physically and electrically connected to each of the two adjacent electrodes in the electrode group;
   a separator that is disposed at least between the adjacent battery cells to achieve insulation of the battery cells; and
   a holding member that holds a state in which the battery cell and the separator are alternately stacked, wherein
   the separator includes a lid that covers the electrical connection member connected to the electrode from a side opposite to the battery cell,
   the separator includes a holding portion that is separate from the lid,
   the holding portion connects the electrical connection member to the separator, and
   the electrical connection member extends away from the holding portion and toward the electrodes.

9. The battery module according to claim 1, wherein
   the separator includes a rectangular protruding portion, and the holding portion is formed to either side of the rectangular protruding portion.

10. The battery module according to claim 3, wherein
    the separator includes second guide wall, each of the guide wall and the second guide wall extends away from a top edge of the separator, the second guide wall is spaced apart from guide wall in a first direction, and the components of the battery monitoring system extend between the guide wall and the second guide wall.

11. The battery module according to claim 5, wherein
    the separator includes a first locking body that abuts one of the battery cells, and
    the holding structure extends away from and is connected to the first locking body.

* * * * *